United States Patent [19]

Terzaghi

[11] 4,048,399
[45] Sept. 13, 1977

[54] DOUBLE WALL MULTITUBE BAGS FOR ENCLOSING THE ACTIVE MATERIAL OF POSITIVE PLATES IN ELECTRIC LEAD BATTERIES

[75] Inventor: Giovanni Terzaghi, Milan, Italy

[73] Assignee: Mecondor S.p.A., Milan, Italy

[21] Appl. No.: 751,897

[22] Filed: Dec. 17, 1976

Related U.S. Application Data

[63] Continuation of Ser. No. 600,100, July 29, 1975, abandoned.

[30] Foreign Application Priority Data

Mar. 26, 1975 Italy .................................. 21766/75
Apr. 17, 1975 Italy .................................. 22459/75

[51] Int. Cl.² ........................................... H01M 2/18
[52] U.S. Cl. .................................................. 429/141
[58] Field of Search ................ 429/141, 140, 136, 238

[56] References Cited

U.S. PATENT DOCUMENTS

| 2,896,006 | 7/1959 | Sundberg | 429/140 |
| 2,972,000 | 2/1961 | Boriolo | 429/140 |
| 3,265,535 | 8/1966 | Sundberg | 429/141 |
| 3,266,935 | 8/1966 | Boriolo | 429/136 X |
| 3,503,807 | 3/1970 | Sundberg | 429/141 |
| 3,843,412 | 10/1974 | Sundberg | 429/238 X |

Primary Examiner—C. F. LeFevour
Attorney, Agent, or Firm—Max Fogiel

[57] ABSTRACT

Multitube sheath or bag for enclosing the active material of positive plates in electric lead batteries. The bag comprises four discrete fabrics simultaneously made on a shuttleless loom. The fabrics are interconnected along parallel lines by means of one or more weft threads. Thereby, every side of each tube comprises a double wall formed by two different fabrics, of which the inner fabric has weft threads of glass yarn and warp threads of synthetic yarn, the number of weft threads being much larger than that of warp threads at a same length of the fabric involved. The two outer fabrics are essentially made of synthetic yarn.

15 Claims, 7 Drawing Figures

DOUBLE WALL MULTITUBE BAGS FOR ENCLOSING THE ACTIVE MATERIAL OF POSITIVE PLATES IN ELECTRIC LEAD BATTERIES

This application is a continuation of Ser. No. 600,100 filed July 29, 1975 now abandoned.

BACKGROUND OF THE INVENTION

The present invention relates to multitube double wall bags or sheaths for enclosing the active material of positive plates in electric lead accumulators or batteries.

The invention also relates to the positive plates and batteries provided by the use of the bags and the method for obtaining such bags.

One of the methods for providing positive plates in electric lead batteries is to enclose the active material forming such plates in bags or sheaths of a tubular shape.

It is well known that these bags should present a considerable chemical resistance to the attack of electrolyte (diluted sulphuric acid) and to the attack of nascent oxygen released by the active material surface and should also be provided with a high mechanical strength in order to withstand the changes in volume to which the active material, when converted from $PbO_2$ to $PbSO_4$ and vice versa, is subjected during plate operation in the battery.

In order to achieve these results, several designs of bags have been provided, both of single wall and double wall type. Some types of single wall bags have been disclosed, for example, in British Patents No. 1,167,082, No. 809,884 and No. 908,060, in U.S. Pat. No. 2,981,783, 3,462,305 and 2,847,496, and in French Patent No. 2,171,064.

The single wall bags disclosed in these patents are made with fabrics formed of thermorectractable synthetic fibers, or fabrics made of various fibers of organic or/and inorganic nature, particularly synthetic fibers and glass fiber, with the organic fibers interwoven with the inorganic fibers, so as to have externally prevailingly organic ones. In these tubes there is the disadvantage that the synthetic fibers (comprising the mechanically resistant structure of the tubes) do not absolutely insure resistance to electrolyte and oxidation, and can also develop materials contaminating the electrolyte.

In order to overcome this disadvantage, it has been proposed to provide bags formed by double wall tubes, wherein use is usually made of an inner tube formed by fiber glasses and an outer tube comprising a sheet of synthetic material, or made with a synthetic yarn. Particularly, the inner tube is made of chemical grade glass yarn since no other material appears to exhibit such guarantee of chemical resistance, which is mostrly required at contact of the positive active material, just at the limit between solid and liquid phases, where the oxidizing action by nascent oxygen is strongest. It should also be noted that glass, being an inorganic material, is capable of exhibiting the highest guarantee against electrolyte defilement or contamination.

A bag or sheath of this design is shown in French Pat. No. 1,172,485, the patent disclosing single double wall tubes comprising an inner tube of microporous plastic material and an outer tube of glass fiber or synthetic yarn fabric.

Still another embodiment is described in the U.S. Pat. No. 3,503,807 showing a bag comprising a number of square tubes formed by bending a length of cover material around the four sides of a mandrel. The tubes are stacked and may then be wrapped with a flat sheet of cover material. British Pat. No. 832,569 discloses a multitube bag or sheath, in which each of the individual tubes comprise an outer wall of synthetic fiber and an inner wall of a thin fiber glass felt. the British Pat. No. 844,544 discloses single double wall tubes comprising an inner tube of braided glass yarn and an outer tube formed by a sheet of perforated plastic material. All of the prior art double wall tubes suffer from the disadvantage of being made in a complicated manner and in several stages, since the outer and inner tubes are separately made and only later they are interconnected to produce such double wall tubes. Moreover, single glass yarns present the negative point or feature of having an elongated factor and flexural strength close to nil, They must be braided to be used. Braided tubes can expand, but this is only an apparent elasticity, as any increase in diameter of such tubes would gives a detriment of the length, since glass yarns do not substantially exhibit any elongation.

Attempts have been made to overcome this disadvantage by covering the tubes of braided glass yarn with tubes of plastic material, or to block the same with a painting of thermosetting resin: however, these are but compromise solutions not imparting the required elasticity to the tubes and are unstable and complicated to the highest degree when using glueing sustems to connect the borders or edges of the outer plastic material tube to those of the inner glass yarn tube, or to block the ends of tubes made of glass yarn.

The foregoing is applicable to the case in which the inner glass yarn tubes are first prepared or provided and the outer synthetic material tubes are made thereon.

On the other hand, where double wall tubes are provided by inserting an inner tube in a previously prearranged outer tube, several operations are required, and namely the separate forming of the outer tubes, mandrel coating with the inner tubes and inserting such mandrels so coated within the outer tubes. As it will be readily understood, all of these operations are somewhat complicated and laborious and lead to the production of double wall tubes, in which the individual inner and outer tubes, respectively, are loose and independent of one another.

The present applicant has also provided double wall tubes as obtained by overlapping and interconnecting four discrete layers of fabric, the two outer fabrics of which are made of synthetic fibers, whereas the two inner fabrics are of fiber glass, or mixed synthetic and glass fiber, such overlapped layers being interconnected, for example, by seams or heat weldings along parallel lines defining the tubes and separating the same from those adjacent thereto in every multitube bag or sheath. In this embodiment, the disadvantage mainly consists of the necessity of separately providing the four fabrics making up the double wall tubes and then combining and interconnecting such fabrics, as above mentioned.

SUMMARY OF THE INVENTION

It is the primary object of the present invention to provide double wall multitube bags for enclosing the active material of positive plates in electric lead accumulators or batteries, as obtained from a tubular quadruple woven fabric, which in addition to high chemical resistance to electrolyte attack and high mechanical strength, also exhibit the feature of a considerable constructive symplicity and a comparatively low cost of production.

These and still further objects are accomplished by a double wall multitube bag as provided from a tubular quadruple fabric comprising four layers of woven fabric which are interconnected along parallel lines to provide discrete and successive double wall tubes, the sheath or bag being stiffened by thermosetting resin at least partly covering the yarns comprising the four layers of fabric, the sheath or bag being characterized in that the two layers of inner fabric have the weft made of glass yarn of high chemical resistance type and warp made of synthetic yarn, that the two layers of outer fabric have warp made of synthetic yarn and weft made of synthetic yarn or glass yarn of high chemical resistance type, that at least in the two layers of inner fabric the number of weft threads is much larger than that of warp threads, that said synthetic yarn comprises thermoplastic materials of a high resistance to diluted sulphuric acid and oxidation, and that the connection for the four layers of fabric along said parallel lines is accomplished by the tie of at least one weft thread inserted between the warps of the four interwoven fabrics.

BRIEF DESCRIPTION OF THE DRAWING

In order that the structure and features of the sheath or bag be more clearly understood, two embodiments thereof will now be described, as given by mere way of unrestrictive example, reference being had to the accompanying drawings, in which.

DESCRIPTION OF THE PREFERRED EMBODIMENTS

Figure 1:
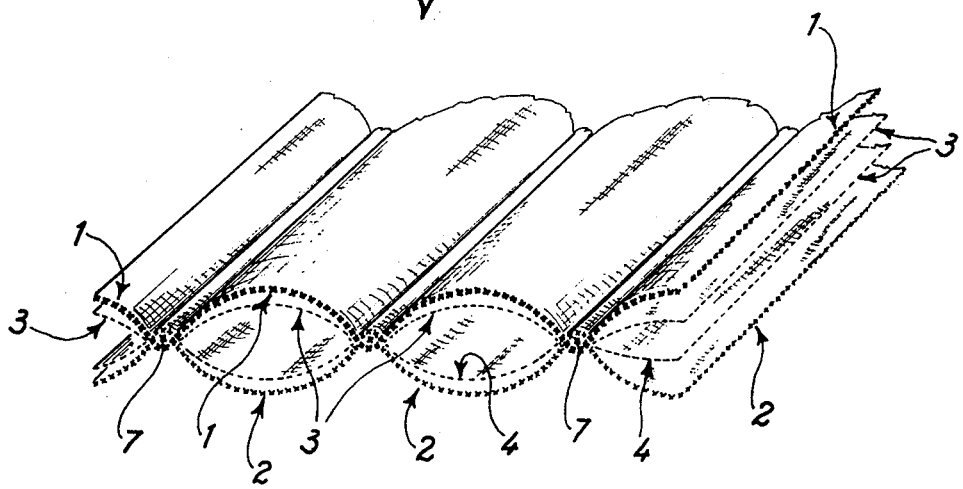
FIG. 1 is a diagrammatic perspective view showing a tubular quadruple woven fabric bifore being subjected to the thermal process, wherein the warps of the outer fabrics and those of the inner fabrics are in each double wall tube always positioned at the same side relative to a plane containing the axes of the tubes.
Figure 2:
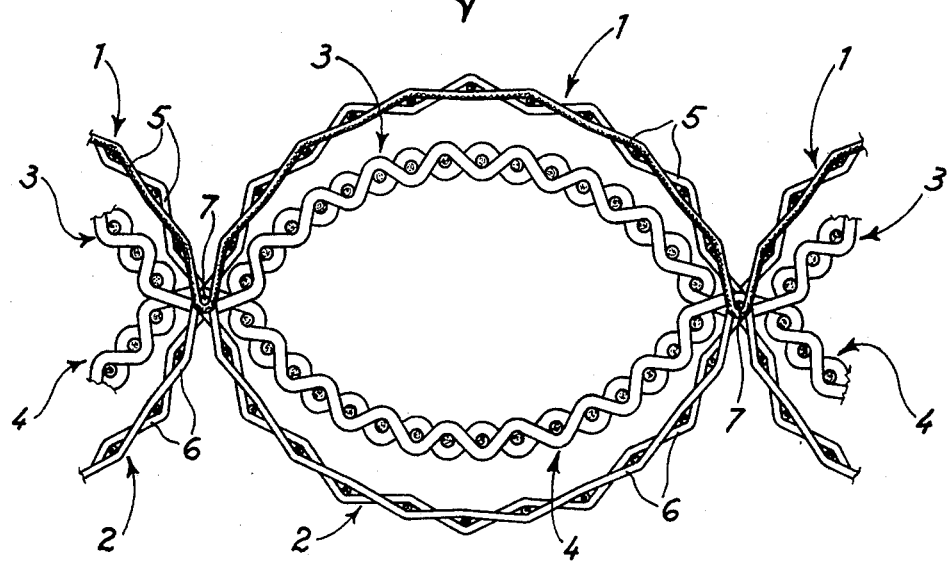
FIG. 2 is an enlarged sectional transversal view of the tubes, showing a portion of the sheath shown in FIG. 1.

Reference is first made to FIGS. 1 and 2 relating to an embodiment of a bag according to the present invention. The tubular quadruple woven fabric at collapsed condition as starting material for providing the sheath or bag comprises four discrete layers of fabric, that is two outer fabrics respectively designated by reference numerals 1 and 2, and two inner fabrics respectively designated by reference numerals 3 and 4.

Such fabrics are completely and simultaneously made on a single shuttleless loom which is well known in the textile art. Therefore, there is no need of describing herein in detail the loom structure and operation thereof for producing the bag at a collapsed condition. More particularly, after providing by said shuttleless loom the four discrete fabrics 1, 2, 3 and 4 at a same time for a length corresponding to the desired width of the individual tubes of the sheath or bag at a collapsed condition, the warp threads 5 of fabric 1 will interweave or interpose between the warp threads 6 of fabric 2 and at the same time between the warp threads of the inner fabrics 3 and 4, whereby the warps for the four so interwoven fabrics are tied by a single weft thread 7, which is therefore common to all of the four fabrics, binding the same to one another.

As soon as the four fabrics have been tied by a single shedding of weft thread 7, said four fabrics will again be separately provided by the shuttleless loom and then interwoven again with another shedding of weft thread as soon as the desired width for the so produced double wall tube is reached. In the above described embodiment, wherein said four fabrics 1, 2, 3 and 4 are interconnected by a single shedding of weft thread according to parallel lines and spaced apart (or should such fabrics be connected by three, five or an odd number of sheddings of weft thread), the warps for the two outer fabrics 1 and 2 and for the inner fabrics 3 and 4 are always positioned on the same side relative to a plane containing the axes of the individual tubes comprising the sheath or bag, the warps being transverse to and the wefts parallel to the axes of the tubes.

Figure 3:
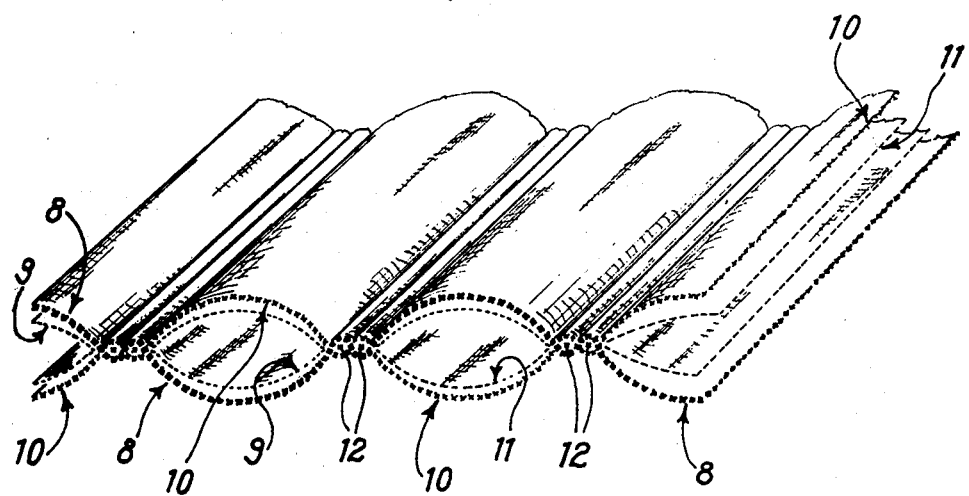
FIG. 3 is a diagrammatic perspective view showing a tubular quadruple woven fabric of saft, flexible nature, wherein the warps of the outer fabrics and those of the inner fabrics are inverted with respect to the plane containing the tube axis, passing from one double-wall tube to those immediately adjacent thereto.
Figure 4:
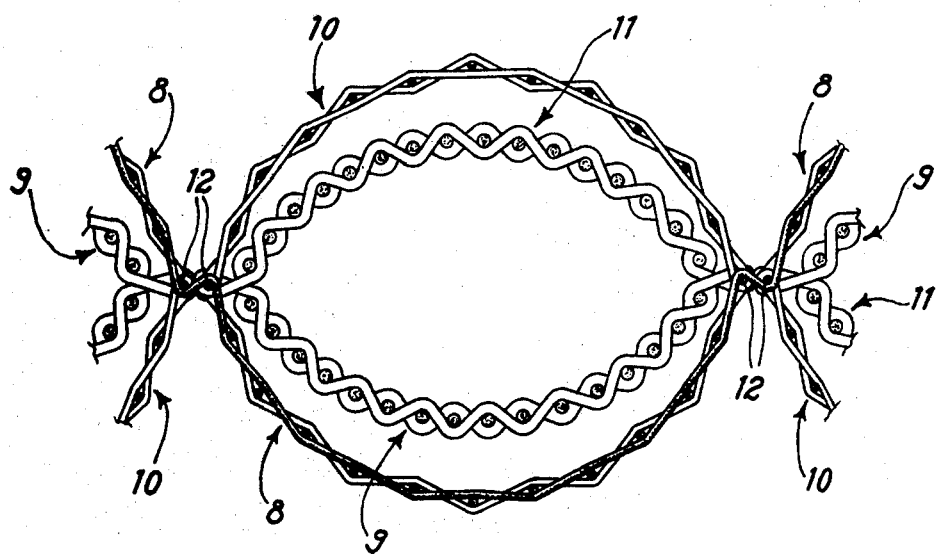
FIG. 4 is an enlarged sectional view showing a portion of the sheath of FIG. 3.

On the other hand, FIGS. 3 and 4 diagrammatically show an embodiment for a multitube sheath or bag comprising two outer fabrics 8 and 10 and two inner fabrics 9 and 11, the warp threads of which are interwoven and tied to one another according to parallel lines by two distinct sheddings of weft thread 12. Also in this case, the sheath or bag is provided on a single shuttleless loom, and therein the warps for the two outer fabrics 8 and 10 and those for the inner fabrics 9 and 11 are inverted, passing from one tube to that adjacent thereto, with respect to a plane containing the axes of the individual tubes, as clearly shown in the figures.

The same result of inverting the fabrics, as described, would be obtained should the fabrics be tied to one another by an even number of sheddings of weft thread.

As it will be readily understood from the foregoing, the provision or production of double wall multitube bags on a single shuttleless loom, as provided according to the present invention from a tubular quadruple woven fabric, is very simple and highly inexpensive, in addition to insuring the highest resistance or strength of the tubes at the crossing lines of the fabrics where the weft threads 7 and 12, respectively, are provided. In the above described bags, the two layers of inner fabric have a weft made by glass yarn of high chemical resistance type (for example with 18 sheddings/cm) and a warp made by synthetic yarn (for example, continuous polyester filaments having a count of 250 deniers with 7 sheddings/ cm): in the two inner fabrics, the weft threads of glass yarn are always in excess with respect to the warp threads of synthetic yarn for a given length of the fabrics. The two layers of outer fabric for the sheath or bag are made with warp threads of synthetic yarn or glass yarn.

The sheddings of weft thread making up the bindings for the four inner and outer fabrics are preferably made of synthetic yarn. The yarns of fiber glass, as used in making the bag, are of high chemical resistance type (commercially known with the designation "C" glass), whereas the yarns of synthetic fibers are of the type exhibiting a high resistance to diluted sulphuric acid and oxidation, or are made of vinyl, acryl, polyester, polypropylene and the like materials.

The tubular quadruple interwoven fabric provided at collapsed condition, as hereinabove described, as impregnated with a thermosetting resin (for example, phenol, epoxy, or the like resins) which is prepolymerized at such a low temperature as 70° C. Now, metal mandrels of a desired cross-section (generally circular section) are inserted between the two inner layers of fabric of each of the collapsed tubes and then the tubular quadruple interwoven fabric with the mandrels inserted in the various tubes is introduced into an oven or furnace at the required temperature for completely polymerizing the thermosetting resin, so as to achieve the desired degree of stiffening, for the sheath or bag which is perfectly and evenly porous. The oven processing temperature will depend on the type of thermosetting resin used for impregnation, in any case this temperature ranging between 100° C and 200° C. At the end of oven processing, the metal mandrels are removed and the sheaths or bags are longitudinally and transversely cut to the required size (height and number of tubes for each of the bags). The bags so obtained are ready tu use, that is for making up the shell and armature for a positive plate in an electric lead battery.

In the above decribed bags, the outer wall of each of the tubes performs the function of mechanical container with peculiar characteristics of resistance to bursting and sufficient elasticity to accomodate the changes in volume of the active material in the positive plates of the batteries. Obviously, also the chemical resistance to the electrolyte and oxidation are very high. The inner wall of each of the tubes mainly performs the function of filtering and chemical protection. More particularly, the filtering and chemical protection function or task in the inner fabrics of the tubes is most exclusively accomplished by the fiber glass yarn, whereas the warping synthetic yarn imparts the required transverse elasticity to each of the tubes.

Figure 5:
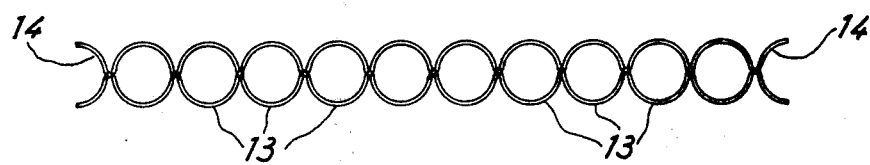
FIG. 5 is a diagrammatic cross-sectional view taken along line V—V of FIG. 6, showing a multitube bag provided with side tabs which have been impermeabilized.
Figure 6:
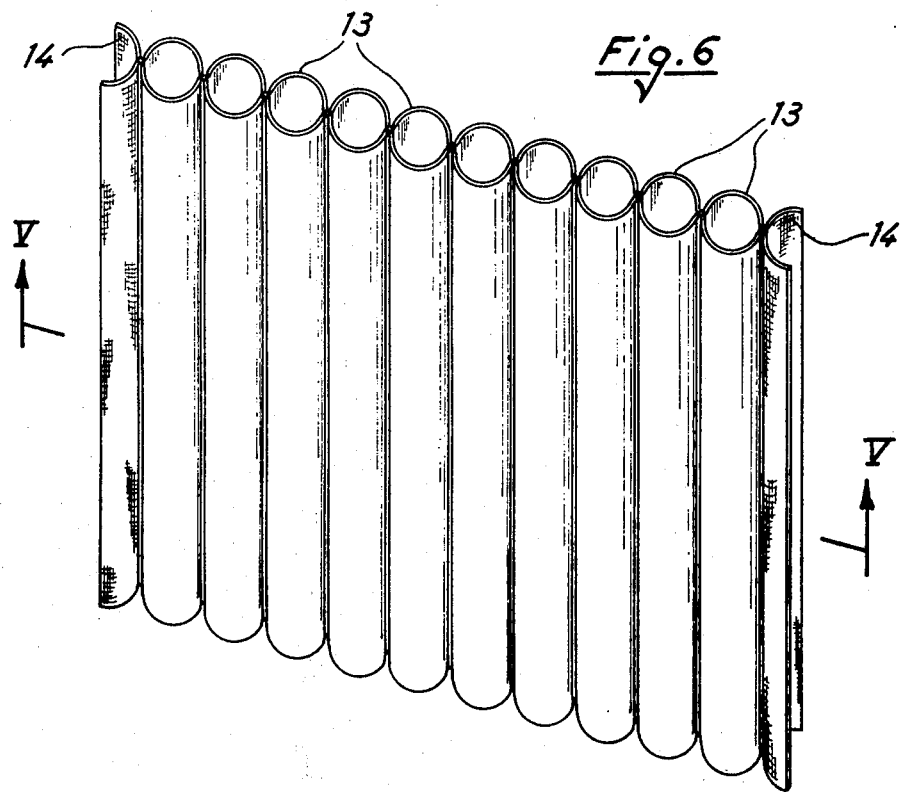
FIG. 6 is a diagrammatic perspective view showing a multitube bag provided with impermeabilized side tabs produced according to the method of the invention.
Figure 7:
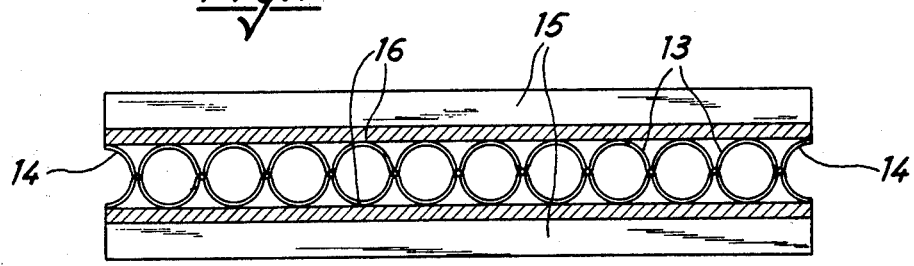
FIG. 7 is a diagrammatic cross-sectional view showing a cell of a lead accumulator or battery insluding the multitube sheath or bag of FIGS. 5 and 6.

As shown in FIGS. 2 and 4, the outer wall is spaced from the inner wall between junctions of the tubes to allow the two separate walls to exercise their separate functions whereby the outer wall provides mechanical resistance to bursting and the inner wall provides for chemical resistance. Preferably, provision is made at each of the two side ends of the bag for a side tab comprising half a side tube of the bag. In such an embodiment, diagrammatically shown in FIGS. 5 and 6, where the tubes 13 make up the sheaths or bags, each of the tabs 14 are impermeabilized by any suitable material which is insulating and resistant to the acid electrolytic solution, such as synthetic resin or paint, wax or bitumen, heat meltable type of polymers or copolymers, etc., as applied by spreading the material on each of the half tubes, or impregnating by dipping the half tube into the impregnating material. Impermeabilization of the side tabs can be also provided by glueing thereon lengths of a tape of plastic material, such as polyvinyl chloride, polythene, polypropylene, polyester and so on. The side tabs of the bags so provided are impervious to migrations of lead particles into the battery, of which such sheaths or bags are part. Therefore, in those batteries where each of the multitube bags of FIGS. 5 and 6 are located between two micropolous partitions 16 and two negative plates 15 (FIG. 7), when these tabs are caused to adhere to the ordinary partitions located between the positive and negative plates, said tabs will prevent any shortcircuit between positive and negative plates. Thus, it is well known that in charge and discharge operating cycles in a lead battery, the lead which is present as ion or as suspended particles in the acidic electrolytic solution will tend to deposit on the battery plates as arborescences, or as spongy protuberances or/and agglomerates. These lead arborescences will grow on the negative plates to go around the partitions dividing them from the adjoining positive plates and to reach such positive plates.

Various expedients are known to overcome this disadvantage, such as the use of a single semiblind or semidead tube at each of the vertical sides of the plates, which entails the non-use of half a tube, and accordingly a reduction in the active surface: the use of a plastic small plate carried on the negative plate; the painting or resination of the negative plates, or the use of microporous envelope partitions. However, all of these expedients, either do not provide fully satisfactory results, or are of complicate and expensive implementation.

Therefore, the side tabs of the bag have the purpose to simply and economically solve the insulating problem for the two vertical sides of the positive plates in lead batteries, and more particularly the problem of laterally insulating these positive plates, that is to render the same impervious to migrations of lead particles.

Obviously, in addition to the above described bags, the present invention is intended to cover the method for providing such bags, the plates using said bags and the batteries provided with said plates.

What I claim is:

1. A multitube bag for enclosing active materials of positive plates in a lead-acid battery, said multitube bag comprising: four layers of woven fabric tied to one another at regular intervals to provide discrete and successive double wall tubes, weft threads of said four fabric layers being parallel to the axes of said tubes, thermosetting resin covering at least partly the yarns of said four fabric layers for stiffening said multitube bag, two of said layers having inner fabric with a weft of substantially high chemical resistance glass yarn and a warp thread of synthetic yarn, two layers having outer fabric with a warp of synthetic yarn and a weft, the weft threads being larger in number than the warp threads in at least the two layers of inner fabric, said synthetic yarn comprising yarn exhibiting substantially high resistance to diluted sulphuric acid and oxidation, the four layers of woven fabric being tied to one another by weft threads inserted between the warps of the four interwoven fabrics.

2. A double wall multitube bag as claimed in claim 1, including a tab formed by a portion of end tube of the bag at two side ends, said portion of end tube of the bag being impermeabilized by insulating inert material and being substantially as long as the bag tubes.

3. A double wall multitube bag as defined in claim 1 wherein said active material of said positive plates is substantially enclosed within said bag.

4. A double wall multitube bag as claimed in claim 1 including an electrolyte in said batteries, substantially the full surface of said bag being exposed to said electrolyte.

5. A multitube bag as claimed in claim 1 wherein said weft of said two layers of outer fabric is comprised of synthetic yarn.

6. A multitube bag as claimed in claim 1 wherein said weft of said two layers of outer fabric is comprised of substantially high chemical resistant glass yarn.

7. A multitube bag as defined in claim 1 wherein the warps for the four interwoven fabrics are tied by weft threads common to all four fabrics and bind the same to one another.

8. A multitube bag according to claim 1 wherein said four fabrics are interconnected by shedding of weft threads in spaced parallel lines.

9. A multitube bag according to claim 1 wherein the warps for the two outer and for the two inner fabrics being always positioned on the same side relative to a plane containing the axes of the individual tubes, the warps being transverse to and the wefts parallel to the axes of the tubes.

10. A multitube bag according to claim 1 wherein the warp threads are interwoven and tied to one another in parallel lines by two distinct sheddings of weft threads, the warps for the two outer fabrics and the warps for the inner fabrics being inverted and passing from one tube to the adjacent tube with respect to a plane containing the axes of the tubes.

11. A multitube bag according to claim 1 wherein the two layers of inner fabric have a weft of glass yarn of substantially high chemical resistance and a warp of synthetic yarn, the weft threads of glass yarn being in excess with respect to the warp threads of synthetic yarn for a predetermined length of fabric, the two layers of outer fabric having warp threads of synthetic yarn.

12. A multi-tube bag according to claim 1 wherein the outer wall of each tube being elastic for changes in volume of the active material in the electrodes of the accumulator, the inner wall of each of the tubes comprising filter means for chemical protection.

13. A multitube bag according to claim 1 wherein the two outer fabrics being spaced from the two inner fabrics between junctions of the tubes, said outer and inner fabrics being free of laminations, the two outer fabrics being mechanically resistant to bursting and the two inner fabrics being chemically resistant.

14. A multitube bag according to claim 1 including a tab formed by a portion of end tube of the bag at two side ends, said portion of end tube of the bag being impermeabilized by insulating inert material and being substantially as long as the bag tubes, said active material of said positive plates being substantially enclosed within said bag; an electrolyte in said battery, substantially the full surface of said bag being exposed to said electrolyte, said weft of said two layers of outer fabric being comprised of synthetic yarn or substantially high chemical resistant glass yarn, the warps for the four interwoven fabrics being tied by a single weft thread common to all four fabrics and binding the same to one another, said four fabrics being interconnected by a single shedding of weft thread in spaced parallel lines, the warps for the two outer and for the two inner fabrics being always positioned on the same side relative to a plane containing the axes of the individual tubes, the warps being transverse to and the wefts parallel to the axes of the tubes, the warp threads being interwoven and tied to one another in parallel lines by two distinct sheddings of weft thread, the warps for the two outer fabrics and the warps for the inner fabrics being inverted and passing from one tube to the adjacent tube with respect to a plane containing the axes of the tubes, the two layers of inner fabric having a weft of glass yarn of substantially high chemical resistance and a warp of synthetic yarn, the weft threads of glass yarn being in excess with respect to the warp threads of synthetic yarn for a predetermined length of fabric, the two layers of outer fabric having warp threads of synthetic yarn, the outer wall of each tube being elastic for changes in volume of the active material in the electrodes of the accumulator, the inner wall of each of the tubes comprising filters means for chemical protection; two microporous partitions, each partition being in contact with the periphery of said tubes and on the side of said tubes opposite to the other partition; a negative plate in contact with each one of said partitions, said tabs inhibiting short circuiting between positive and negative plates of said accumulator, the side tabs being impervious to migrations of lead particles into said accumulator, said tabs adhering to said partitions, the two outer fabrics being spaced from the two inner fabrics between junctions of the tubes, said outer and inner fabrics being free of laminations, the two outer fabrics being mechanically resistant to bursting and the two inner fabrics being chemically resistant.

15. A multitube bag according to claim 2 including two microporous partitions, each partition being in contact with the periphery of said tubes and on the side of said tubes opposite to the other partition; and a negative plate in contact with each one of said partitions, said tabs inhibiting short circuiting between positive and negative plates of said accumulator, the side tabs being impervious to migrations of lead particles into said accumulator, said tabs adhering to said partitions.

* * * * *